United States Patent
Koike (10) Patent No.: US 8,510,554 B2
(45) Date of Patent: Aug. 13, 2013

(54) KEY MANAGEMENT SYSTEM, KEY MANAGEMENT METHOD, SERVER APPARATUS AND PROGRAM

(75) Inventor: Kazuhide Koike, Tokyo (JP)

(73) Assignee: NEC Corporation, Tokyo (JP)

( * ) Notice: Subject to any disclaimer, the term of this patent is extended or adjusted under 35 U.S.C. 154(b) by 551 days.

(21) Appl. No.: 12/782,621

(22) Filed: May 18, 2010

(65) Prior Publication Data
US 2010/0299521 A1  Nov. 25, 2010

(30) Foreign Application Priority Data
May 22, 2009  (JP) ................................. 2009-124236

(51) Int. Cl.
*H04L 29/06* (2006.01)
(52) U.S. Cl.
USPC ............ 713/168; 380/279; 380/255; 380/277
(58) Field of Classification Search
USPC .......................... 380/255, 277, 279; 713/168
See application file for complete search history.

(56) References Cited

U.S. PATENT DOCUMENTS

| 2009/0214043 A1* | 8/2009 | Choi et al. ..................... 380/279 |
| 2010/0290627 A1* | 11/2010 | Tsuji et al. ..................... 380/282 |
| 2011/0249817 A1* | 10/2011 | Park et al. ..................... 380/281 |

FOREIGN PATENT DOCUMENTS

JP  9-319673 A  12/1997

* cited by examiner

*Primary Examiner* — Brandon Hoffman
*Assistant Examiner* — Hee Song (57) ABSTRACT

Disclosed is a key management system including plural terminal devices and a server. Each of the terminal devices includes: authentication means for authenticating a user and acquiring user information; delivery key registration means for registering a delivery key linked to the user information based on corresponding information, transmitted from the server, between the user information and the delivery key; encryption key receiving means for receiving an encryption key using the delivery key. The server includes terminal information storage means for storing the terminal identification information, user information on the user utilizing the terminal device and the delivery key, wherein the terminal identification information, the user information and the delivery key are linked to each other; and encryption key delivering means for transmitting the encryption key using the delivery key linked to the user information on the user performing secret communication.

10 Claims, 8 Drawing Sheets

| TERMINAL ID | AUTHENTICATION IDENTIFIER | DELIVERY KEY |
|---|---|---|
| 10-1 | A | X |
|  | B | Y |
|  | C | Z |
| 10-2 | A | X |
|  | B | Y |
|  | C | Z |
| 10-3 | A | X |
|  | B | Y |
|  | C | Z |
| ... | ... | ... |

Fig.5

| TERMINAL ID | AUTHENTICATION IDENTIFIER | DELIVERY KEY |
|---|---|---|
| 10-1 | A | X |
| 10-2 | B | Y |
| 10-3 | C | Z |
| ... | ... | ... |

KEY MANAGEMENT SYSTEM, KEY MANAGEMENT METHOD, SERVER APPARATUS AND PROGRAM

This application is based upon and claims the benefit of priority from Japanese Patent Application No. 2009-124236, filed on May 22, 2009, the disclosure of which is incorporated herein in its entirety by reference.

TECHNICAL FIELD

The present invention relates to a management system and a management method for an encryption key used for secret communication, a server apparatus and a program, which performs secret communication in a network using the encryption key.

BACKGROUND ART

In recent years, since the security of information is becoming more and more important, secret or cryptographic communication in a communication network is indispensable. That is, communication information is encrypted at a transmitting end, and transmitted to a receiving end. The receiving end, which has received the encrypted information, decrypts the encrypted information, and obtains the communication information.

In such cryptographic communication, managing an encryption key for performing encryption and decryption is important. That is, the encryption key, which encrypts and decrypts communication information, is managed only at the transmitting end and at the receiving end.

Recently, it is common that a server apparatus manages an encryption key, and delivers the key to terminal devices, which perform secret communication. That is, before the secret communication is performed between such terminal devices, the server apparatus delivers the encryption key to the terminal devices, and the terminal devices perform the secret communication using the encryption key. Meanwhile, the term "delivery" throughout the specification means processing for transmitting key information to a specific terminal device. Secret communication between terminal device, in which an encryption key remains unchanged, increases a risk of code-breaking of the encryption key and of an interception of the communication by a third party. In order to solve this problem, a server apparatus updates the encryption key periodically and delivers the updated encryption key to the terminal devices. The terminal devices perform the secret communication using the updated encryption key. However, since the updated encryption key is often delivered via a communication network between the server apparatus and the terminal devices, the encryption key is required to be delivered so as not to be intercepted by a third party. Japanese Patent Application Laid-Open No. 1997-319673 discloses an encryption key updating method and a system thereof for updating an encryption key, wherein an encryption key server apparatus transmits data for updating the encryption key to each client apparatus, and the client apparatus receives the update data, and receives update permission from the encryption key server to update the encryption key.

SUMMARY

The object of the present invention is to provide a key management system, a key management method, a server apparatus and a program for making an encryption key exclusively correspond to a user of a terminal device, and updating the encryption key, even if the user of the terminal device is changed.

A key management system, according to an exemplary aspect of the invention, includes plural terminal devices and a server. Each of the terminal devices includes: authentication means for authenticating a user, and acquiring user information on the user; user information transmission means for transmitting the user information acquired by the authentication means; corresponding information receiving means for receiving corresponding information between the user information and a delivery key; delivery key storage means for storing the delivery key; delivery key registration means for registering the delivery key linked to the user information in the delivery key storage means based on the corresponding information; encryption key receiving means for receiving an encryption key using the delivery key stored in the delivery key storage means; and user change means for authenticating a changed user and acquiring changed user information on the changed user, and transmitting the changed user information. The server includes: master information storage means for storing the corresponding information between the user information on a user to utilize the terminal device and a delivery key used when an encryption key is transmitted, the correspondence information being linked to terminal identification information on the terminal device; terminal information storage means for storing the terminal identification information, user information on the user utilizing the terminal device and the delivery key used when the encryption key is transmitted to the terminal device, wherein the terminal identification information, the user information and the delivery key are linked to each other; encryption key delivering means for transmitting the encryption key using the delivery key stored in the terminal information storage means, the delivery key being linked to the user information on the user performing secret communication; corresponding information transmission means for transmitting the corresponding information between the user information and the delivery key, stored in the master information storage means, to the terminal device; first user information receiving means for receiving first user information on a user first authenticated at the terminal device; first user information registration means for updating the user information stored in the terminal information storage means, the user information being linked to the terminal identification information, by the first user information received by the first user information receiving means; delivery key registration means for updating the delivery key stored in the terminal information storage means, the delivery key being linked to the terminal device, by a first delivery key linked to the first user information received by the first user information receiving means, based on the corresponding information; second user information receiving means for receiving the changed user information of the changed user authenticated at the terminal device; and second user information registration means for updating the user information stored in the terminal information storage means, the user information being linked to the terminal identification information, by the changed user information received by the second user information receiving means.

A key management method, according to an exemplary aspect of the invention, in a key management system including: plural terminal devices; and a server, which stores corresponding information between user information on a user utilizing a terminal device of the plural terminal devices and a delivery key, which is stored in the terminal device and is used when an encryption key is transmitted to the terminal device, wherein the corresponding information is linked to terminal identification information on the terminal device, includes steps of: transmitting the corresponding information between the user information and the delivery key, the corresponding information being linked to the terminal device, to the terminal device from the server; authenticating the user at the terminal device, and acquiring the user information on the user; registering the delivery key, linked to the acquired user information, in the terminal device based on the corresponding information; transmitting the acquired user information to the server; receiving, in the server, first user information on a user first authenticated at the terminal device; updating the user information stored in the server, the user information being linked to the terminal identification information, by the received first user information; updating the delivery key stored in the server, the delivery key being linked to the terminal device, by a first delivery key linked to the received first user information, based on the corresponding information; transmitting the encryption key using the delivery key stored in the server to the terminal device, the delivery key being linked to the user information on the user performing secret communication; receiving the encryption key using the registered delivery key; authenticating, when the user utilizing the terminal device changes, a changed user and acquiring changed user information on the changed user, and transmitting the changed user information to the server; and updating, when the server receives the changed user information, the user information stored in the server, the user information being linked to the terminal identification information, by the received changed user information.

A server, which transmits an encryption key to a terminal device, according to an exemplary aspect of the invention, includes: master information storage means for storing corresponding information between user information on a user to utilize the terminal device and a delivery key, which is stored in the terminal device and is used when the encryption key is transmitted, the correspondence information being linked to terminal identification information on the terminal device; terminal information storage means for storing the terminal identification information, user information on the user utilizing the terminal device and the delivery key used when the encryption key is transmitted to the terminal device, wherein the terminal identification information, the user information and the delivery key are linked to each other; encryption key delivering means for transmitting the encryption key using the delivery key stored in the terminal information storage means, the delivery key being linked to the user information on the user performing secret communication; corresponding information transmission means for transmitting the corresponding information between the user information and the delivery key, stored in the master information storage means, to the terminal device; first user information receiving means for receiving first user information on a user first authenticated at the terminal device; first user information registration means for updating the user information stored in the terminal information storage means, the user information being linked to the terminal identification information; by the first user information received by the first user information receiving means; delivery key registration means for updating the delivery key stored in the terminal information storage means, the delivery key being linked to the terminal device, by a first delivery key linked to the first user information received by the first user information recording means, based on the corresponding information; elimination instruction transmission means for transmitting an elimination instruction to instruct the terminal device to eliminate a delivery key, which is stored in the terminal device and is not linked to the first user information, based on the corresponding information; second user information receiving means for receiving, when the user utilizing the terminal device changes, changed user information on a changed user; and second user information registration means for updating the user information stored in the terminal information storage means, the user information being linked to the terminal identification information, by the changed user information received by the second user information receiving means.

A recording medium, according to an exemplary aspect of the invention, in which a program which makes a computer execute processing to manage a key in a system including: plural terminal devices; and a server, which stores corresponding information between user information on a user utilizing a terminal device of the plural terminal devices and a delivery key, which is stored in the terminal device and is used when an encryption key is transmitted to the terminal device, wherein the corresponding information is linked to terminal identification information on the terminal device, the processing includes steps of: transmitting the corresponding information between the user information and the delivery key, the corresponding information being linked to the terminal device, to the terminal device from the server; authenticating the user at the terminal device, and acquiring the user information on the user; registering the delivery key, linked to the acquired user information, in the terminal device based on the corresponding information; transmitting the acquired user information to the server; receiving, in the server, first user information on a user first authenticated at the terminal device; updating the user information stored in the server, the user information being linked to the terminal identification information, by the received first user information; updating the delivery key stored in the server, the delivery key being linked to the terminal device, by a first delivery key linked to the received first user information, based on the corresponding information; transmitting the encryption key using the delivery key stored in the server to the terminal device, the delivery key being linked to the user information on the user performing secret communication; receiving the encryption key using the registered delivery key; authenticating, when the user utilizing the terminal device changes, a changed user and acquiring changed user information on the changed user, and transmitting the changed user information to the server; and updating, when the server receives the changed user information, the user information stored in the server, the user information being linked to the terminal identification information, by the received changed user information.

A key management system, according to an exemplary aspect of the invention, includes: plural terminal devices and a server. Each of the terminal devices includes: an authentication unit that authenticates a user, and acquires user information on the user; a user information transmission unit that transmits the user information acquired by the authentication unit; a corresponding information receiving unit that receives corresponding information between the user information and a delivery key; a delivery key storage unit that stores the delivery key; a delivery key registration unit that registers the delivery key linked to the user information in the delivery key storage unit based on the corresponding information; an encryption key receiving unit that receives an encryption key using the delivery key stored in the delivery key storage unit; a user change unit that authenticates a changed user and acquires changed user information on the changed user, and transmits the changed user information. The server includes: a master information storage unit that stores the corresponding information between the user information on a user to utilize the terminal device and a delivery key used when the encryption key is transmitted, the correspondence information being linked to terminal identification information on the terminal device; a terminal information storage unit that stores the terminal identification information, user information on the user utilizing the terminal device and the delivery key used when the encryption key is transmitted to the terminal device, wherein the terminal identification information, the user information and the delivery key are linked to each other; an encryption key delivering unit that transmits the encryption key using the delivery key stored in the terminal information storage unit, the delivery key being linked to the user information on the user performing secret communication; a corresponding information transmission unit that transmits the corresponding information between the user information and the delivery key, stored in the master information storage unit, to the terminal device; a first user information receiving unit that receives first user information on a user first authenticated at the terminal device; a first user information registration unit that updates the user information stored in the terminal information storage unit, the user information being linked to the terminal identification information, by the first user information received by the first user information receiving unit; a delivery key registration unit that updates the delivery key stored in the terminal information storage unit, the delivery key being linked to the terminal device, by a first delivery key linked to the first user information received by the first user information receiving unit, based on the corresponding information; a second user information receiving unit that receives the changed user information of the changed user authenticated at the terminal device; and a second user information registration unit that updates the user information stored in the terminal information storage unit, the user information being linked to the terminal identification information, by the changed user information received by the second user information receiving unit.

BRIEF DESCRIPTION OF THE DRAWINGS

Exemplary features and advantages of the present invention will become apparent from the following detailed description when taken with the accompanying drawings in which.

EXEMPLARY EMBODIMENT

Hereinafter, an exemplary embodiment of the present invention will be described in detail with reference to the drawings.

Figure 1:
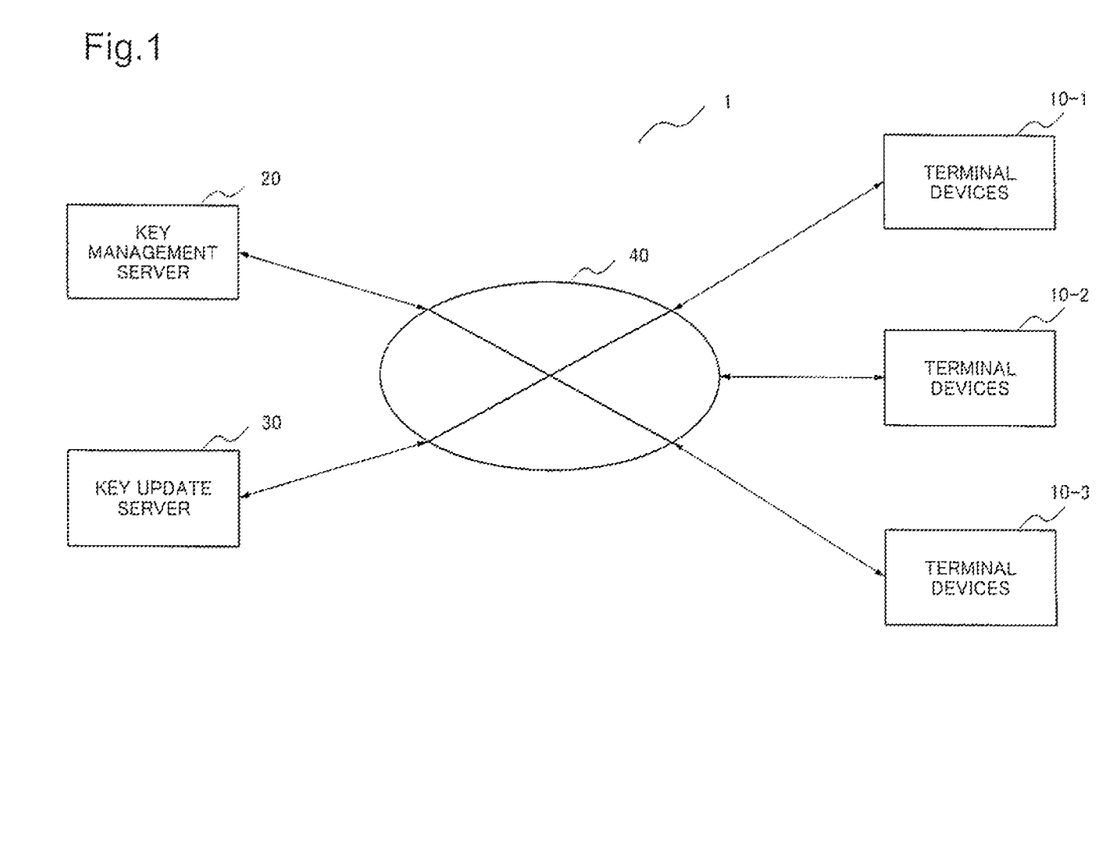
FIG. 1 is a schematic configuration diagram showing an embodiment of a key management system according to the present invention.

FIG. 1 shows an example of a configuration of a key management system according to the exemplary embodiment of the present invention.

A key management system 1 includes plural terminal devices 10-1 to 10-3, a key management server 20 (server apparatus) and a key update server 30. The plural terminal devices 10-1 to 10-3, the key management server 20 and the key update server 30 are connected mutually via a network 40. Note that, in the following, the key management system 1 including three terminal devices as shown in FIG. 1 will be described. However, the number Of terminal devices is not limited to three, and the key management system 1 may include more than three terminal devices.

The terminal device 10-1 holds an encryption key used for performing secret communication with the other terminal devices 10-2 and 10-3. Similarly, each of the terminals 10-2 and 10-3 also holds an encryption key used for secret communication with other terminal devices. The key management server 20 manages corresponding information, which shows a correspondence between an authentication identifier for identifying each of the users of the terminal devices 10-1 to 10-3 and a delivery key linked to the terminal device. The key update server 30 holds a delivery key and an encryption key, and delivers the delivery key and the encryption key to any of the terminal devices 10-1 to 10-3, as necessary. Meanwhile, the term "delivery", used here, means a processing for transmitting key information to a designated terminal device of the terminal devices 10-1 to 10-3.

Figure 2:
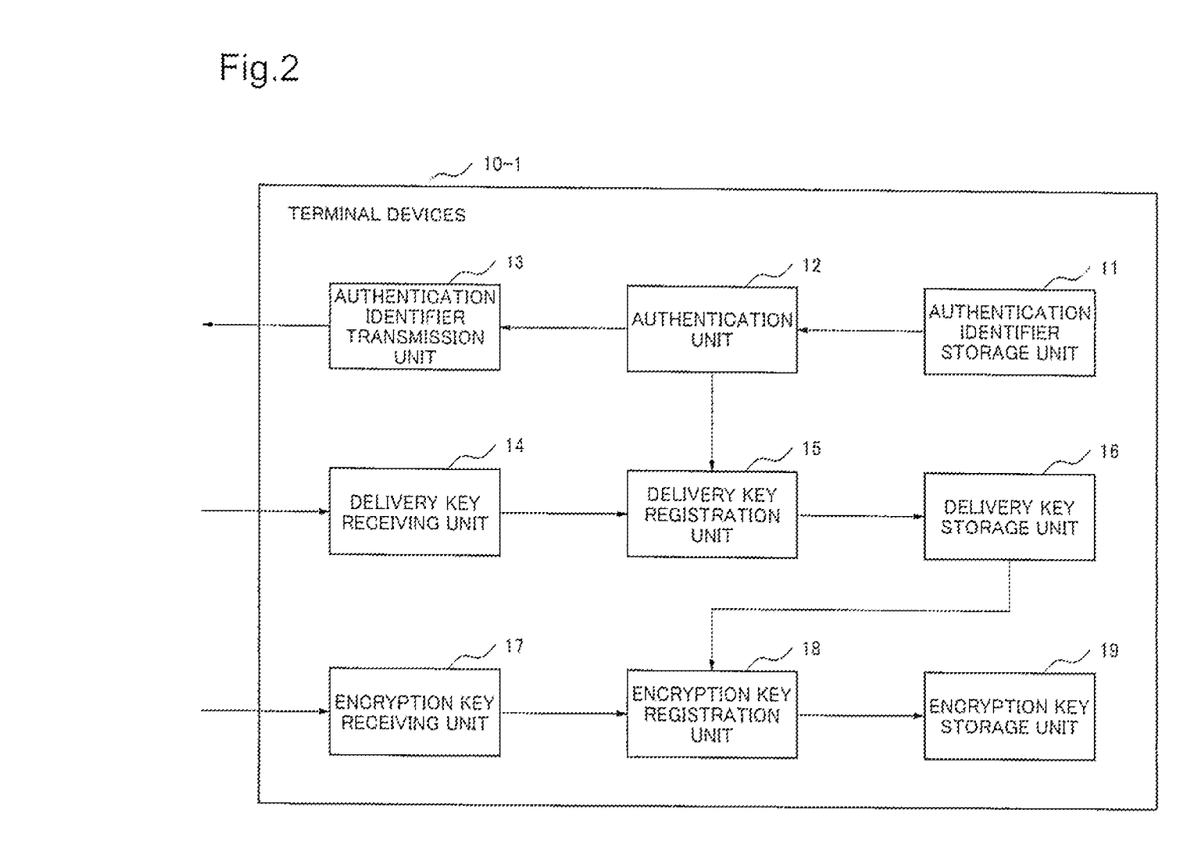
FIG. 2 is a block diagram showing a configuration of a terminal device according to the exemplary embodiment of the present invention.

FIG. 2 shows an example of a configuration of the terminal device according to the exemplary embodiment of the present invention. FIG. 2 shows a configuration of the terminal device 10-1, but the terminal devices 10-2 and 10-3 have the same configuration as the terminal device 10-1.

The terminal device 10-1 includes an authentication unit 12 (authentication means or user change means), which authenticates a user, an authentication identifier storage unit 11, and an authentication identifier transmission unit 13. The authentication identifier storage unit 11 is connected to the authentication unit 12, and stores an authentication identifier (user information), which indicates a user. The authentication identifier transmission unit 13 is connected to the, authentication unit 12, and transmits the authentication identifier of the user authenticated by the authentication unit 12 to the key management server 20 (user information transmission means).

The authentication identifier storage unit 11 may store a password used for authenticating a user identified by the authentication identifier linked to the user.

The terminal device 10-1 further includes: a delivery key receiving units 14 (correspondence information receiving means), which receives a delivery key used in decrypting the encryption key; a delivery key storage unit 16, which stores the delivery key; and a delivery key registration unit 15. The delivery key registration unit 15 is connected to the delivery key receiving unit 14, the authentication unit 12 and the delivery key storage unit 16, and registers the delivery key received at the delivery key receiving unit 14 in the delivery key storage unit 16 based on an authentication result of the authentication unit 12. The terminal device 10-1 further includes: an encryption key receiving unit 17 (encryption key receiving means), which receives the encryption key used in the secret communication; an encryption key storage unit 19, which stores the encryption key; and an encryption key registration unit 18. The encryption key registration unit 18 is connected to the encryption key receiving unit 17, the encryption key storage unit 19 and the delivery key storage unit 16, decrypts the encryption key, received at the encryption key receiving unit 17, using the delivery key stored in the delivery key storage units 16, and registers the decrypted encrypted key in the encryption key storage unit 19.

Figure 3:
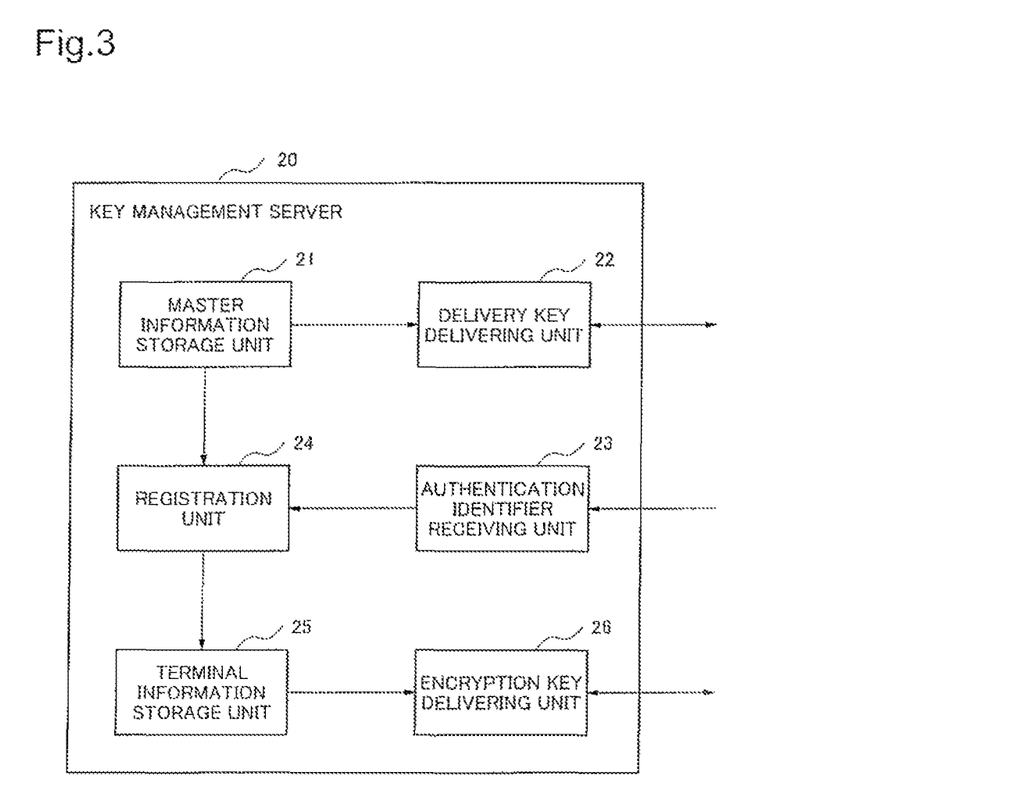
FIG. 3 is a block diagram showing a configuration of a key management server apparatus according to the exemplary embodiment of the present invention.

FIG. 3 shows an example of a configuration of the key management server 20 according to the exemplary embodiment of the present invention.

The key management server 20 includes: a master information storage unit 21 (master information storage means), and a delivery key delivering unit 22 (correspondence information transmission means or deletion instruction transmission means). The master information storage unit 21 stores, for each of the terminal devices 10-1 to 10-3, an authentication identifier indicating a user who can be authenticated, and a delivery key linked to the user. The delivery key delivering unit 22 is connected to the master information storage unit 21, and transmits the corresponding information between the authentication identifier and the delivery key, to each of the terminal devices 10-1 to 10-3, based on information stored in the master information storage unit 21. The key management server 20 further includes an authentication identifier receiving unit 23 (first user information receiving means or second user information receiving means), which receives the authentication identifier of the user authenticated by any one of the terminal devices 10-1 to 10-3.

The key management server 20 further includes a terminal information storage unit 25 (terminal information storage means), which stores (1) a terminal identification information for identifying the terminal devices 10-1 to 10-3, (2) an authentication identifier indicating a user logging into any one of the terminal devices 10-1 to 10-3 identified by the terminal identification information, and (3) a delivery key used in delivering the encryption key to any one of the terminal devices 10-1 to 10-3 identified by the terminal identification information, wherein the terminal identification identifier, the authentication identifier and the delivery key are linked to each other.

The key management server 20 further includes a registration unit 24 (user information registration means or delivery key registration means), which is connected to the authentication identifier receiving unit 23, the master information storage unit 21 and the terminal information storage unit 25. The registration unit 24 registers (A) an authentication identifier received at the authentication identifier receiving unit 23 and (B) a delivery key, corresponding to user information on a user first authenticated at any one of the terminal devices 10-1 to 10-3, in the terminal information storage unit 25. The key management server 20 further includes an encryption key delivering unit 26 (encryption key delivering means), which is connected to the terminal information storage unit 25. The encryption key delivering unit 26 delivers the encryption key to any one of the terminal devices 10-1 to 10-3 using the delivery key stored in the terminal information storage unit 25, the delivery key being linked to the user information.

Figure 4:
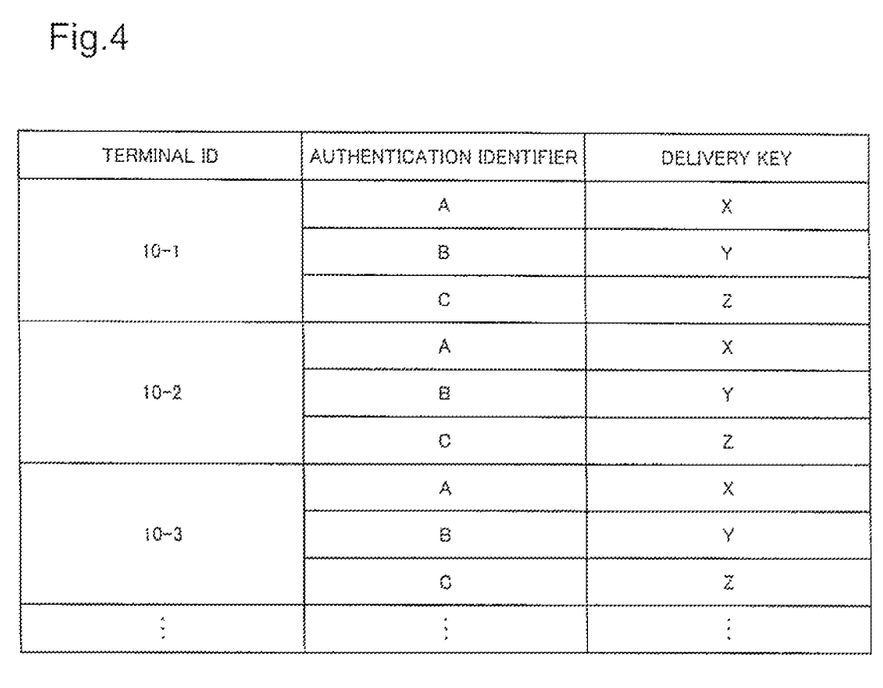
FIG. 4 shows an example of information stored in a master information storage unit according to the exemplary embodiment of the present invention.

FIG. 4 shows an example of information stored in the master information storage unit 21 according to the exemplary embodiment of the present invention.

The master information storage unit 21 in the server apparatus 20 stores an authentication identifier of a user who can use a terminal device and a delivery key used by the user, wherein the authentication identifier and the delivery key are linked to the terminal ID designating a terminal device of the terminal devices 10-1 to 10-3. In the master information storage unit 21, plural sets, each including an authentication identifier and a delivery key, are linked to one terminal ID.

Figure 5:
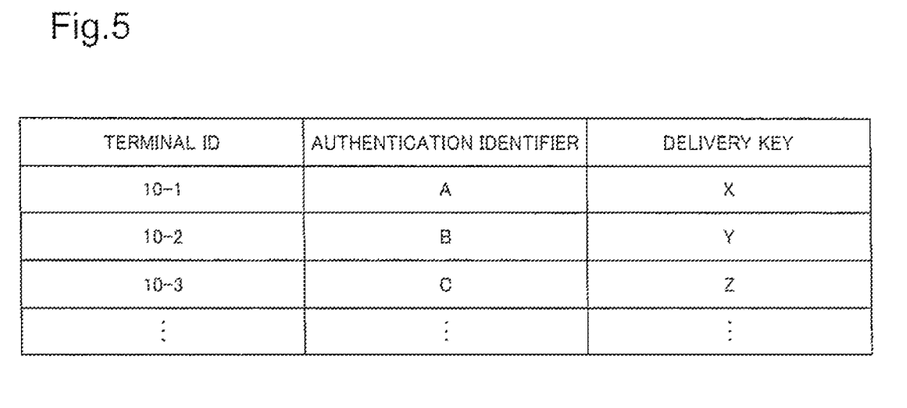
FIG. 5 shows an example of information stored in a terminal information storage unit according to the exemplary embodiment of the present invention.

FIG. 5 shows an example of information stored in the terminal information storage unit 25 according to the exemplary embodiment of the present invention.

The terminal information storage unit 25 of the server 20 stores the authentication identifier of a user logging into a terminal device of the terminal devices 10-1 to 10-3 and a delivery key used in encrypting an encryption key to be delivered to the terminal device, wherein the authentication identifier and the delivery key are linked to the terminal ID indicating the terminal device among the terminal devices 10-1 to 10-3. In the terminal information storage unit 25, a set, including an authentication identifier and a delivery key, is linked to one terminal ID.

The delivery key delivering unit 22 of the server 20 delivers the delivery key stored in the master information storage unit 21 and linked to any one of the terminal devices 10-1 to 10-3 to the corresponding terminal device of the terminal devices 10-1 to 10-3. The delivery key receiving units 14 of any one of the terminal devices 10-1 to 10-3 receives the delivery keys from the server 20. Next, the authentication unit 12 of any one of the terminal devices 10-1 to 10-3 accepts an authentication operation by a user and acquires an authentication identifier indicating the user from the authentication identifier storage unit 11. The delivery key registration unit 15 registers only a delivery key, which is linked to the authentication identifier acquired by the authentication unit 12, among delivery keys received by the delivery key receiving units 14, in the delivery key storage unit 16. The authentication identifier transmission unit 13 of any one of the terminal devices 10-1 to 10-3 transmits the authentication identifier, acquired by the authentication unit 12, to the server 20. The authentication identifier receiving unit 23 of the server 20 receives the authentication identifier of a user first authenticated at any one of the terminal devices 10-1 to 10-3.

Next, the registration unit 24 of the server 20 rewrites the authentication identifier, stored in the terminal information storage unit 25 and linked to the terminal ID of any one of the terminal devices 10-1 to 10-3, to the authentication identifier received by the authentication identifier receiving unit 23. Furthermore, the registration unit 24 rewrites the delivery key, stored in the terminal information storage unit 25 and linked to the terminal ID of any one of the terminal devices 10-1 to 10-3, to the delivery key, received at the authentication identifier receiving unit 23, stored in the master information storage unit 21 and linked to the authentication identifier.

When the authentication unit 12 of any one of the terminal devices 10-1 to 10-3 accepts a user change operation, the authentication unit 12 acquires the authentication identifier indicating the user after the change operation from the authentication identifier storage unit 11. The authentication identifier transmission unit 13 transmits the acquired authentication identifier to the server 20. The authentication identifier receiving unit 23 of the server 20 receives the authentication identifier of the user authenticated at any one of the terminal devices 10-1 to 10-3 through the user change operation. The registration unit 24 rewrites the authentication identifier of any one of the terminal devices 10-1 to 10-3, stored in the terminal information storage unit 25, to the authentication identifier received at the authentication identifier receiving unit 23.

The encryption key delivering unit 26 of the server 20 delivers an encryption key to any one of the terminal devices 10-1 to 10-3 using a delivery key, stored in the terminal information storage unit 25 and linked to the authentication identifier indicating a user performing a secret communication. The encryption key receiving unit 17 of any one of the terminal devices 10-1 to 10-3 receives an encryption key from the server 20 using the delivery key stored in the delivery key storage unit 16.

The key management system 1 according to the exemplary embodiment prevents an abuse of a delivery key by other user, and even after the user change operation in the terminal device, the encryption key of the user is updated.

Next, operation of the key management system 1 according to the exemplary embodiment of the present invention will be described. Hereinafter, a processing in the terminal device 10-1 is described. But, the processing in the terminal device 10-2 and 10-3 is the same as the terminal device 10-1.

Figure 6:
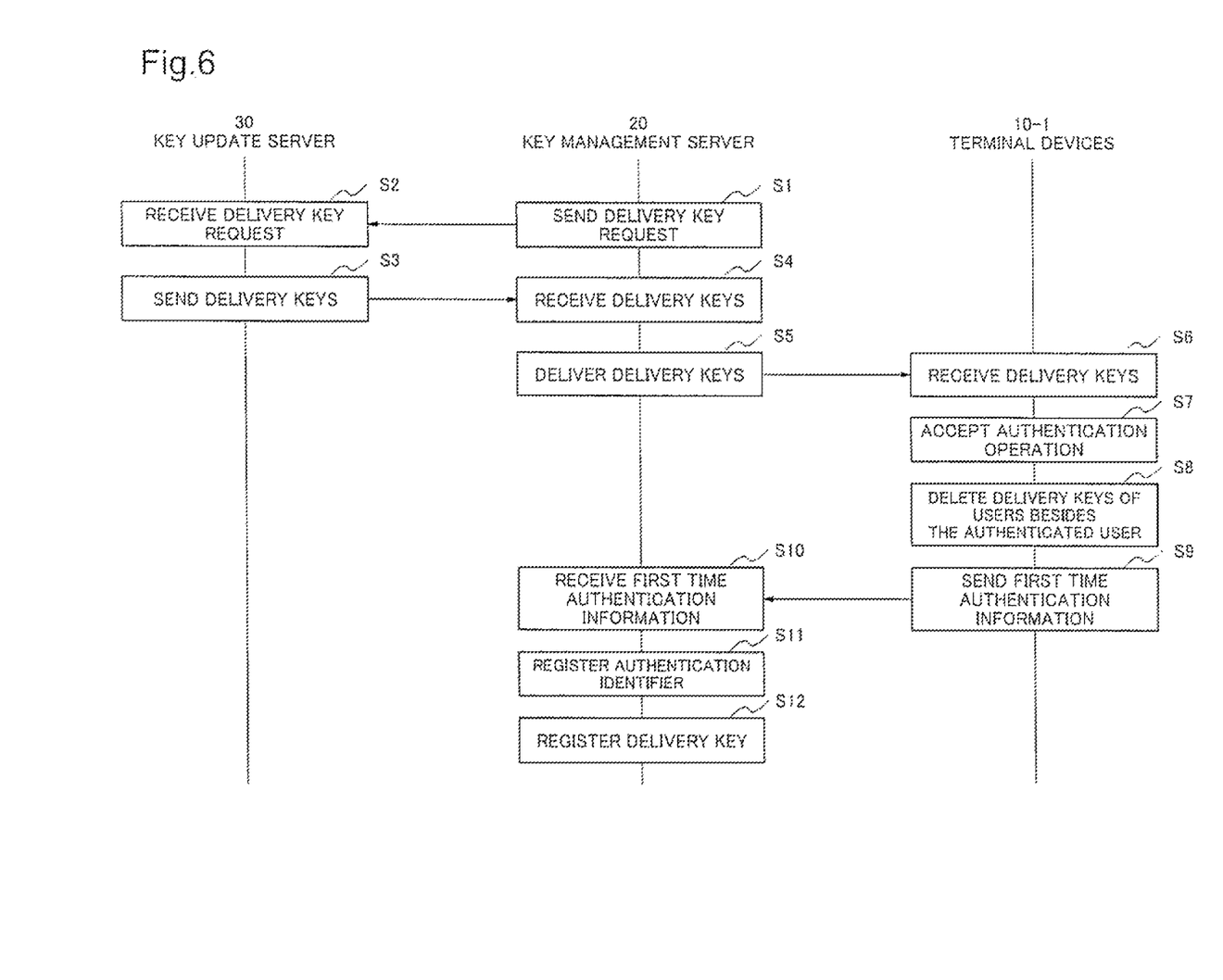
FIG. 6 is a sequence diagram showing an example of processing for registering a delivery key for the terminal device according to the exemplary embodiment of the present invention.

FIG. 6 shows an example of processing for registering a delivery key in the terminal device 10-1 according to the exemplary embodiment of the present invention.

First, the delivery key delivering unit 22 of the key management server 20, referring to the master information storage unit 21, acquires information on a delivery key, linked to the terminal ID indicating the terminal device 10-1. When the information on the delivery keys is acquired, the delivery key delivering unit 22 transmits a delivery key request for requiring a transmission of the delivery key, to the key update server 30 (Step S1). When the delivery key request is received from the key management server 20 (Step S2), the key update server 30 acquires the delivery key, required by the received delivery key request, and transmits the delivery key to the key management server 20 (Step S3). The delivery key delivering unit 22 of the key management server 20 receives the delivery key from the key update server 30 (Step S4).

When the delivery key delivering unit 22 of the key management server 20 receives the delivery keys, the key management server 20 delivers (a) corresponding information, stored in the master information storage unit 21, and linked to the terminal ID of the terminal device 10-1, showing a correspondence between an authentication identifier and a delivery key, and (b) the received delivery key to the terminal device 10-1 (Step S5). Here, the corresponding information between the authentication identifier and the delivery key means information indicating that the authentication identifier and the delivery key are linked to each other. For example, when the master information storage unit 21 stores information, as shown in FIG. 4, the delivery key delivering unit 22 transmits to the terminal device 10-1 corresponding information indicating that (I) the user with an authentication identifier A is linked to a delivery key X, (II) the user with an authentication identifier B is linked to a delivery key Y and (III) the user with an authentication identifier C is linked to a delivery key Z.

When the key management server 20 delivers the corresponding information and the delivery key to the terminal device 10-1, the delivery key receiving units 14 of the terminal device 10-1 receives the corresponding information and the delivery key from the key management server 20 (Step S6). When the delivery key receiving units 14 receives the corresponding information and the delivery keys, the authentication unit 12 authenticates a user based on the authentication identifier stored in the authentication identifier storage unit 11 (Step S7). The authentication of a user is, for example, performed using an authentication identifier and a password inputted by the user. That is, the authentication unit 12 determines whether the combination of the authentication identifier and the password coincides with the combination stored in the authentication identifier storage unit 11, and the user is assumed to be authenticated when these combinations coincides with each other. When the user is authenticated, the authentication unit 12 acquires the authentication identifier of the user to be authenticated from the authentication identifier storage unit 11.

When the authentication unit 12 of the terminal device 10-1 authenticates the user, the delivery key registration unit 15 eliminates a delivery key, which is not linked to the authentication identifier acquired by the authentication unit 12, among the delivery keys received by the delivery key receiving units 14, based on the corresponding information received by the delivery key receiving units 14. The delivery key registration unit 15 registers only the delivery key, which is linked to the authentication identifier acquired by the authentication unit 12, in the delivery key storage unit 16 (Step S8). The delivery key storage unit 16 has only to store the delivery key, which is linked to the authentication identifier acquired by the authentication unit 12, after the completion of the authentication and before the secret communication starts.

For example, the delivery key storage unit 16 may temporarily store the delivery keys received by the delivery key receiving unit 14 in a buffer memory or the like, and may make the delivery key registration unit 15 register only the delivery key, which is linked to the authentication identifier acquired by the authentication unit, among the delivery keys stored in the buffer memory, in the delivery key storage unit 16. Alternatively, the delivery key storage unit 16 may register all delivery keys received by the delivery key receiving units 14, and the delivery key registration unit 15 may eliminate the delivery key, which is not linked to the authentication identifier acquired by the authentication unit 12, among the delivery keys stored in the delivery key storage unit 16, based on the corresponding information, received by the delivery key receiving units 14.

Moreover, the delivery key delivering unit 22 of the key management server 20 may transmit a deletion instruction to instruct to eliminate the delivery key, which is not linked to the user information on the user first authenticated at the terminal device 10-1, based on the corresponding information to the terminal device 10-1. The terminal device 10-1 receives the deletion instruction and eliminates the delivery keys.

Further, after authentication at the authentication unit 12, a program may be executed so that the delivery key registration unit 15 performs deletion processing.

When the delivery key registration unit 15 eliminates the delivery key, which is not linked to the authentication identifier acquired by the authentication unit 12, the authentication identifier transmission unit 13 transmits first time authentication information, including the authentication identifier acquired by the authentication unit 12 and indicating that the terminal device 10-1 has performed the first time authentication, to the key management server 20 (Step S9).

When the terminal device 10-1 transmits the first time authentication information to the key management server 20, the authentication identifier receiving unit 23 of the key management server 20 receives the first time authentication information from the terminal device 10-1 (Step S10). When the authentication identifier receiving unit 23 receives the first time authentication information, the registration unit 24 registers the authentication identifier included in the first time authentication information in the terminal information storage unit 25, wherein the authentication identifier is linked to the terminal ID indicating the terminal device 10-1 (Step S11). The registration unit 24 registers a delivery key, which is stored in the master information storage unit 21, and which is linked to the terminal ID indicating the terminal device 10-1 and the authentication identifier included in the received first time authentication information, in the terminal information storage unit 25 wherein the delivery key is linked to the terminal ID indicating the terminal device 10-1 (Step S12).

According to the exemplary embodiment, the key management server 20 delivers, on first authenticating a user at the terminal device 10-1, the delivery key linked to the user to the terminal device 10-1, and registers the terminal ID indicating the terminal device 10-1, the authentication identifier indicating the authenticated user and the transmitted delivery key, in the terminal information storage unit 25, wherein they are linked to each other. As a result, since only the delivery key of the user first authenticated is registered at the terminal device 10-1, a risk, where a user logging into the terminal device 10-1 users a delivery key of another user, is removed.

Next, processing for changing a user of the terminal device 10-1 will be described, in the following.

Figure 7:
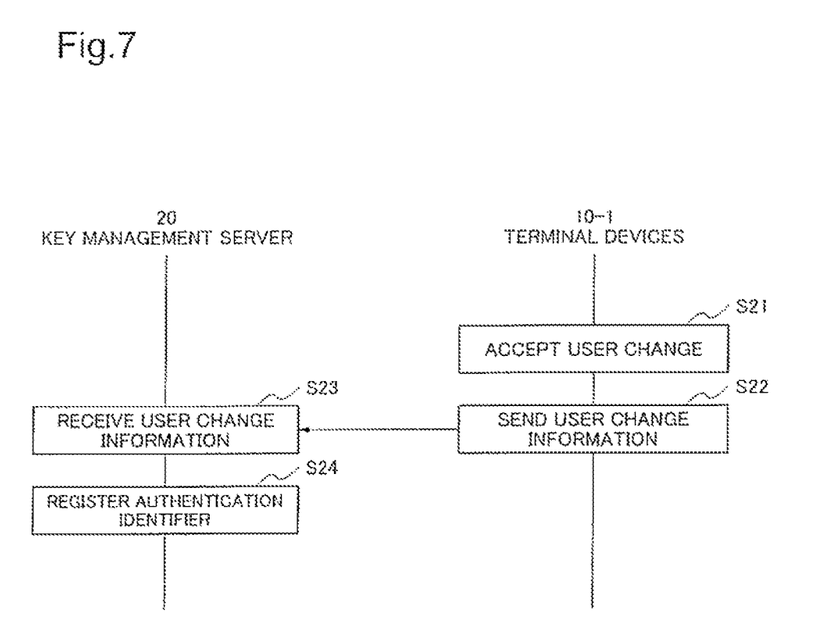
FIG. 7 is a sequence diagram showing an example of processing for changing a user of the terminal device according to the exemplary embodiment of the present invention.

FIG. 7 shows an example of processing for changing a user of the terminal device 10-1 according to the exemplary embodiment of the present invention.

When a user is changed after the terminal device 10-1 authenticated the user in the above-described processing, the authentication unit 12 of the terminal device 10-1 accepts a user change operation (Step S21). The user change operation is, for example, an operation of inputting an authentication identifier and a password by the next user, after the current user's logout operation. On accepting the user change operation, the authentication unit 12 acquires the authentication identifier of the user after the change from the authentication identifier storage unit 11.

When the authentication unit 12 accepts the user change operation, the authentication identifier transmission unit 13 transmits user change information, including the authentication identifier newly acquired by the authentication unit 12 and notifying that the user of the terminal device 10-1 has been changed, to the key management server 20 (Step S22).

When the terminal device 10-1 transmits the user change information, the authentication identifier receiving unit 23 of the key management server 20 receives the authentication identifier from the terminal device 10-1 (Step S23). Then, the registration unit 24 registers the authentication identifier included in the received user change information in the terminal information storage unit 25, wherein the user change information linked to the terminal ID indicating the terminal device 10-1 (Step S24).

Next, processing for delivering an encryption key to the terminal device 10-1 will be described.

Figure 8:
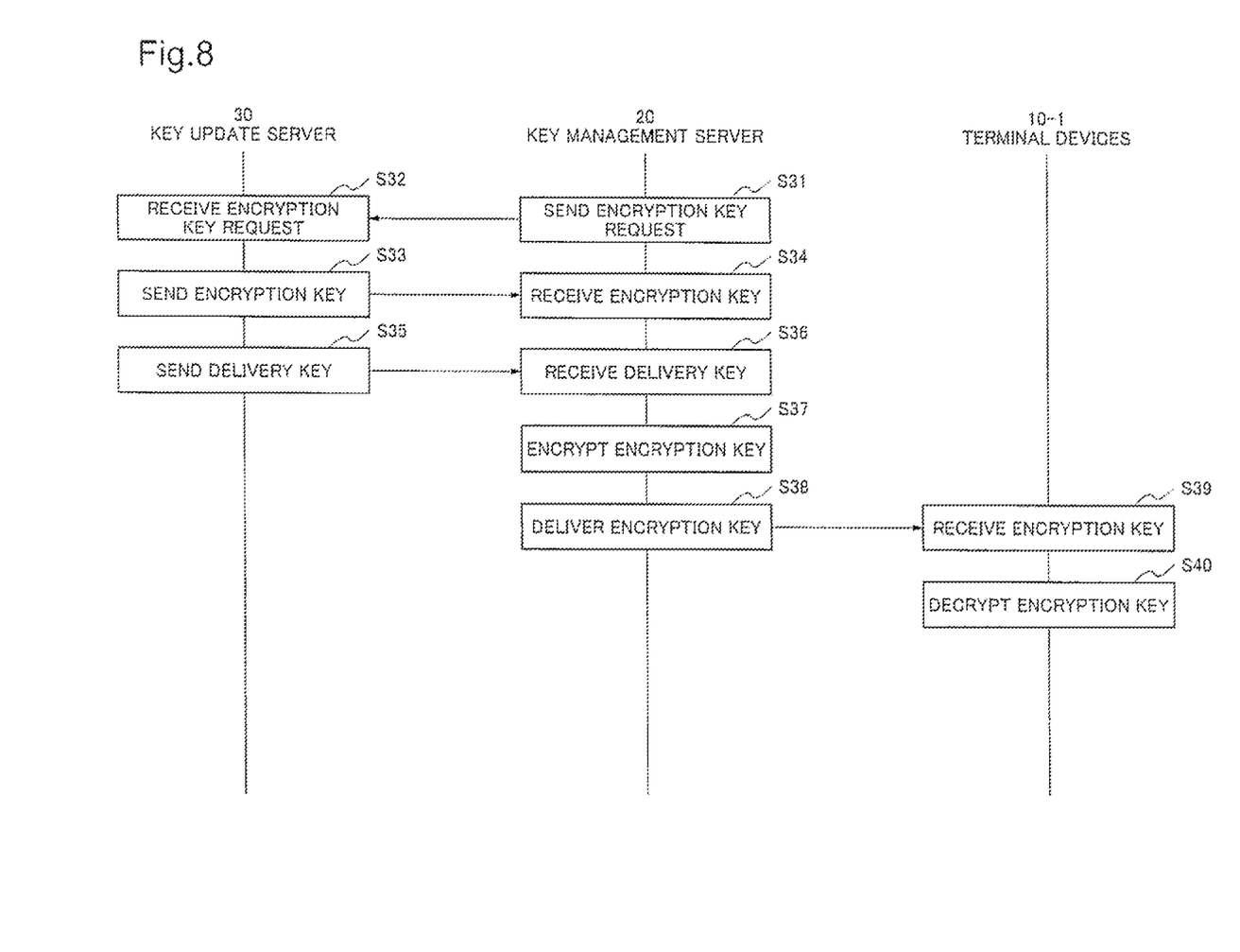
FIG. 8 is a sequence diagram showing an example of processing for delivering the encryption key to the terminal device according to the exemplary embodiment of the present invention.

FIG. 8 shows an example of processing for delivering an encryption key to the terminal device 10-1 according to the exemplary embodiment of the present invention.

First, the encryption key delivering unit 26 of the key management server 20 refers to the terminal information storage unit 25 and acquires information on the delivery key linked to the terminal ID indicating the terminal device 10-1. When the information on the delivery key is acquired, the encryption key delivering unit 26 transmits an encryption key request, for requesting transmission of the delivery key and an encryption key to be delivered to the terminal device 10-1, to the key update server 30 (Step S31).

When the encryption key request is received from the key management server 20 (Step S32), the key update server 30 acquires the encryption key indicating in the received encryption key request, that is, the encryption key to be delivered to the terminal device 10-1, and transmits the encryption key to the key management server 20 (Step S33). Then, the encryption key delivering unit 26 of the key management server 20 receives the encryption key from the key update server 30 (Step S34).

On receiving the encryption key request from the key management server 20, the key update server 30 acquires the delivery key indicated in the received encryption key request and transmits it to the key management server 20 (Step S35). The encryption key delivering unit 26 of the key management server 20 receives the delivery key from the key update server 30 (Step S36).

On receiving the encryption key and the delivery key from the key update server 30, the encryption key delivering unit 26 of the key management server 20 encrypts the received encryption key using the received delivery key (Step S37). The encrypted encryption key is delivered to the terminal device 10-1 (Step S38).

When the key management server 20 delivers the encryption key, the encryption key receiving unit 17 of the terminal device 10-1 receives the encryption key from the key management server 20 (Step S39). When the encryption key receiving unit 17 receives the encryption key, the encryption key registration unit 18 decrypts the received encryption key using the delivery key stored in the delivery key storage unit 16, and registers the decrypted encryption key in the encryption key storage unit 19 (Step S40).

According to this exemplary embodiment, on changing the user logging into the terminal device 10-1 to another user, the key management server 20 receives user change information including the authentication identifier indicating the new user from the terminal device 10-1. Next, the key management server 20 replaces the authentication identifier, stored in the terminal information storage unit 25 and linked to the terminal ID indicating the terminal device 10-1 by the authentication identifier included in the received user change information. The key management server 20 delivers the encryption key using the delivery key linked to the authentication identifier stored in the terminal information storage unit 25. Accordingly, when a user of the terminal device 10-1 is changed, an encryption key is updated for the user after change, using the first-delivered delivery key.

Next, operation of a key management system according to the exemplary embodiment of the present invention will be described, using a specific example.

Assume that the user of the terminal device 10-1 is A, the user of the terminal device 10-2 is B and the user of the terminal device 10-3 is C. As shown in FIG. 4, it is further assumed that any of the terminal devices 10-1 to 10-3 may be used by the user A, B or C. In addition, assume that a delivery key X is linked to the user A, a delivery key Y to the user B and a delivery key Z to the user C.

First, the delivery key delivering unit 22 of the key management server 20 transmits the authentication identifiers of the users and delivery keys of the users to each of the terminal devices 10-1 to 10-3. Next, by carrying out an authentication operation, the authentication unit 12 of the terminal device 10-1 authenticates the user A, and the authentication unit 12 of the terminal device 10-2 authenticates the user B, and the authentication unit 12 of the terminal device 10-3 authenticates the user C. The delivery key registration unit 15 of the terminal device 10-1, then, eliminates delivery keys other than the delivery key X, and the delivery key registration unit 15 of the terminal device 10-2 eliminates delivery keys other than the delivery key Y, and the delivery key registration unit 15 of the terminal device 10-3 eliminates delivery keys other than the delivery key Z. Taking account of possibility that a user of the terminal devices 10-1 to 10-3 may change in the subsequent processing, the authentication identifiers stored in the authentication identifier storage unit 11 in each of the terminal devices 10-1 to 10-3, are not eliminated.

The authentication identifier receiving unit 23 of the key management server 20 receives first time authentication information from the terminal devices 10-1 to 10-3. The registration unit 24 of the key management server 20 registers the authentication identifiers, indicating the authenticated users A, B and C and the delivery keys, wherein the users and the delivery keys are linked to the terminal IDs, respectively, indicating the terminal devices 10-1 to 10-3, in the terminal information storage unit 25. That is, the authentication identifier A and the delivery key X are registered for the terminal ID indicating the terminal device 10-1, the authentication identifier B and the delivery key Y are registered for the terminal ID indicating the terminal device 10-2, and the authentication identifier C and the delivery key Z are registered for the terminal ID indicating the terminal device 10-3.

The encryption key delivering unit 26 of the key management server 20 delivers an encryption key based on the authentication identifier and the delivery key stored in the terminal information storage unit 25.

Processing after the user change will be described, in the following. Assume that the user A of the terminal device 10-1 and the user B of the terminal device 10-2 have exchanged the terminal devices for use mutually. By the processing described as above, the authentication identifier storage unit 11 of the terminal device 10-1 stores the authentication identifiers of the user A and B, and the authentication identifier storage unit 11 of the terminal device 10-2 also stores the authentication identifiers of the user A and B. For this reason, even if the user A and the user B are interchanged, user authentication in each of the terminal devices is possible. Here, when the terminal device 10-1 authenticates the user B and the terminal device 10-2 authenticates the user A, the authentication identifier receiving unit 23 of the key management server 20 receives user change information from each of the terminal devices 10-1 and 10-2.

Next, the registration unit 24 of the key management server 20 replaces the authentication identifiers, stored in the terminal information storage unit 25 and linked to the terminal IDs indicating the terminal devices 10-1 and 10-2, by the authentication identifiers included in the user change information.

The authentication identifier B and the delivery key X are, then, linked to the terminal ID indicating the terminal device 10-1, the authentication identifier A and the delivery key Y are linked to the terminal ID indicating the terminal device 10-2, and the authentication identifier C and the delivery key Z are linked to the terminal ID indicating the terminal device 10-3.

Next, when performing secret communication excluding the user C, in order to prevent interception or tapping of communication content by the user C, the key management server 20 updates the encryption key of the terminal device 10-1 and the terminal device 10-2. Delivery keys X and Y linked to the terminal device 10-1 and the terminal device 10-2, respectively, are used for updating the encryption keys. In this way, the terminal device 10-1 and the terminal device 10-2, receiving the new encryption keys perform secret communication excluding the user C.

Note that, in this exemplary embodiment, the number of the terminal devices 10-1 to 10-3, the number of the users A, B and C and the numbers of the authentication identifiers, the delivery keys and the encryption keys are solely for illustrative purposes, and are not limited to these.

According to this exemplary embodiment, although the key management server 20 and the key update server 30 are separated, the key management system 1 is not limited to this configuration. A single device may be equipped with the functions both of the key management server 20 and the key update server 30.

Each of the above-mentioned key management server 20 and the terminal devices 10-1 to 10-3 has a computer system in the interior thereof. The above-described operation instructions of each processing unit is stored in a computer-readable recording medium in a form of a program, which is read and executed by the computer, so that the above-described processing is performed. Here, the computer-readable recording medium includes such as a magnetic disk, a magneto-optical disk, CD-ROM, DVD-ROM and a semiconductor memory. This computer program may be delivered to a computer via a communication line or wirelessly, so that the computer receiving the delivered program may execute the program.

Also, the above-mentioned program may be a part of the above-described functions. Further, the above-described functions may be realized by combining with a program already provided with in the computer system, or a so-called difference file (a difference program).

In a communication system of the related art, when plural users use one terminal device, one delivery key, shared by the plural users, is held in the terminal device. Using this delivery key, each user receives an encryption key. That is, a server encrypts an encryption key using this delivery key and transmits it to a terminal device. The terminal device receives the encrypted encryption key, and decrypts the encrypted encryption key using the delivery key provided in the terminal device. The terminal device performs secret communication using the decrypted encryption key. When a terminal device holds one common delivery key, user authentication is performed at the terminal device, and a result of the authentication is transmitted to a server. However, the server does not obtain information on a corresponding relationship between a user and the delivery key, until the server acquires the result of the user authentication and terminal identification information. For this reason, such a communication system is at a risk of providing a bogus correspondence between the terminal device and the user.

In order to solve the above-mentioned problem, a terminal device of the related art holds an authentication identifier identifying each user and a delivery key, wherein they are linked to each other. Alternatively, the terminal device holds only a delivery key of a user authenticated first, and eliminates delivery keys of other users.

However, when plural users use one terminal device, if the terminal device holds the authentication identifiers and delivery keys of the plural users, wherein they are linked to each other as described above, a risk, where a user among the plural users abuses a delivery key of the other users via the link, arises. On the other hand, for the terminal device holding only the delivery key of the user first authenticated and eliminating the delivery keys of other users, if a user of the terminal device is changed, there is a problem that the user after the change cannot update the encryption key.

According to the present invention, because only the delivery key of a user authenticated first to be registered in a terminal device, a possibility that a user logging into the terminal device may abuse the delivery keys of the other users, can be excluded.

According to the present invention, when the user of a terminal device is changed, the encryption key can be updated for the user after the change using the delivery key.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore; the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A key management system, comprising:
a plurality of terminal devices, each of which includes:
authentication means for authenticating a user, and acquiring user information on said user;
user information transmission means for transmitting said user information acquired by said authentication means;
corresponding information receiving means for receiving corresponding information between said user information and a delivery key;
delivery key storage means for storing said delivery key;
delivery key registration means for registering said delivery key linked to said user information in said delivery key storage means based on said corresponding information;
encryption key receiving means for receiving an encryption key using said delivery key stored in said delivery key storage means; and
user change means for authenticating a changed user and acquiring changed user information on said changed user, and transmitting said changed user information; and
a server, including:
master information storage means for storing said corresponding information between said user information on a user to utilize said terminal device and a delivery key used when an encryption key is transmitted, said correspondence information being linked to terminal identification information on said terminal device;
terminal information storage means for storing said terminal identification information, user information on said user utilizing said terminal device and said delivery key used when said encryption key is transmitted to said terminal device, wherein said terminal identification information, said user information and said delivery key are linked to each other;
encryption key delivering means for transmitting said encryption key using said delivery key stored in said terminal information storage means, said delivery key being linked to said user information on said user performing secret communication;
corresponding information transmission means for transmitting said corresponding information between said user information and said delivery key, stored in said master information storage means, to said terminal device;
first user information receiving means for receiving first user information on a user first authenticated at said terminal device;
first user information registration means for updating said user information stored in said terminal information storage means, said user information being linked to said terminal identification information, by said first user information received by said first user information receiving means;
delivery key registration means for updating said delivery key stored in said terminal information storage means, said delivery key being linked to said terminal device, by a first delivery key linked to said first user information received by said first user information receiving means, based on said corresponding information;
second user information receiving means for receiving said changed user information of said changed user authenticated at said terminal device; and
second user information registration means for updating said user information stored in said terminal information storage means, said user information being linked to said terminal identification information, by said changed user information received by said second user information receiving means.

2. The key management system according to claim 1, wherein
said server further comprising encryption key updating means for updating an encryption key of a first terminal device and a second terminal device of said plurality of terminal devices, before secret communication between said first terminal device and said second terminal device.

3. A key management method in a key management system comprising: a plurality of terminal devices; and a server, which stores corresponding information between user information on a user utilizing a terminal device of said plurality of terminal devices and a delivery key, which is stored in said terminal device and is used when an encryption key is transmitted to said terminal device, wherein said corresponding information is linked to terminal identification information on said terminal device, said method comprising steps of:
transmitting said corresponding information between said user information and said delivery key, said corresponding information being linked to said terminal device, to said terminal device from said server;
authenticating the user at said terminal device, and acquiring said user information on said user;
registering said delivery key, linked to said acquired user information, in said terminal device based on said corresponding information;
transmitting said acquired user information to said server;
receiving, in said server, first user information on a user first authenticated at said terminal device;
updating said user information stored in said server, said user information being linked to said terminal identification information, by said received first user information;
updating said delivery key stored in said server, said delivery key being linked to said terminal device, by a first delivery key linked to said received first user information, based on said corresponding information;
transmitting said encryption key using said delivery key stored in said server to said terminal device, said delivery key being linked to said user information on said user performing secret communication;
receiving said encryption key using said registered delivery key;
authenticating, when said user utilizing said terminal device changes, a changed user and acquiring changed user information on said changed user, and transmitting said changed user information to said server; and
updating, when said server receives said changed user information, said user information stored in said server, said user information being linked to said terminal identification information, by said received changed user information.

4. The key management method according to claim 3, further comprising a step of:

transmitting from said server an updated encryption key of a first terminal device and a second terminal device of said plurality of terminal devices, before secret communication between said first terminal device and said second terminal device.

5. A server, which transmits an encryption key to a terminal device, comprising:
- master information storage means for storing corresponding information between user information on a user to utilize said terminal device and a delivery key, which is stored in said terminal device and is used when an encryption key is transmitted, said correspondence information being linked to terminal identification information on said terminal device;
- terminal information storage means for storing said terminal identification information, user information on said user utilizing said terminal device and said delivery key used when said encryption key is transmitted to said terminal device, wherein said terminal identification information, said user information and said delivery key are linked to each other;
- encryption key delivering means for transmitting said encryption key using said delivery key stored in said terminal information storage means, said delivery key being linked to said user information on said user performing secret communication;
- corresponding information transmission means for transmitting said corresponding information between said user information and said delivery key, stored in said master information storage means, to said terminal device;
- first user information receiving means for receiving first user information on a user first authenticated at said terminal device;
- first user information registration means for updating said user information stored in said terminal information storage means, said user information being linked to said terminal identification information, by said first user information received by said first user information receiving means;
- delivery key registration means for updating said delivery key stored in said terminal information storage means, said delivery key being linked to said terminal device, by a first delivery key linked to said first user information received by said first user information recording means, based on said corresponding information;
- elimination instruction transmission means for transmitting an elimination instruction to instruct said terminal device to eliminate a delivery key, which is stored in said terminal device and is not linked to said first user information, based on said corresponding information;
- second user information receiving means for receiving, when said user utilizing said terminal device changes, changed user information on a changed user; and
- second user information registration means for updating said user information stored in said terminal information storage means, said user information being linked to said terminal identification information, by said changed user information received by said second user information receiving means.

6. The server according to claim 5, further comprising:
- encryption key updating means for updating an encryption key of a first terminal device and a second terminal device of said plurality of terminal devices, before secret communication between said first terminal device and said second terminal device.

7. A non-transitory computer readable storage medium, in which a program which makes a computer execute processing to manage a key in a system comprising: a plurality of terminal devices; and a server, which stores corresponding information between user information on a user utilizing a terminal device of said plurality of terminal devices and a delivery key, which is stored in said terminal device and is used when an encryption key is transmitted to said terminal device, wherein said corresponding information is linked to terminal identification information on said terminal device, said processing comprising steps of:
- transmitting said corresponding information between said user information and said delivery key, said corresponding information being linked to said terminal device, to said terminal device from said server;
- authenticating the user at said terminal device, and acquiring said user information on said user;
- registering said delivery key, linked to said acquired user information, in said terminal device based on said corresponding information;
- transmitting said acquired user information to said server;
- receiving, in said server, first user information on a user first authenticated at said terminal device;
- updating said user information stored in said server, said user information being linked to said terminal identification information, by said received first user information;
- updating said delivery key stored in said server, said delivery key being linked to said terminal device, by a first delivery key linked to said received first user information, based on said corresponding information;
- transmitting said encryption key using said delivery key stored in said server to said terminal device, said delivery key being linked to said user information on said user performing secret communication;
- receiving said encryption key using said registered delivery key;
- authenticating, when said user utilizing said terminal device changes, a changed user and acquiring changed user information on said changed user, and transmitting said changed user information to said server; and
- updating, when said server receives said changed user information, said user information stored in said server, said user information being linked to said terminal identification information, by said received changed user information.

8. The non-transitory computer readable storage medium according to claim 7, wherein the processing further comprising a step of:
- transmitting from said server an updated encryption key of a first terminal device and a second terminal device of said plurality of terminal devices, before secret communication between said first terminal device and said second terminal device.

9. A key management system, comprising:
- a plurality of terminal devices, each of which includes:
  - an authentication unit that authenticates a user, and acquires user information on said user;
  - a user information transmission unit that transmits said user information acquired by said authentication unit;
  - a corresponding information receiving unit that receives corresponding information between said user information and a delivery key;
  - a delivery key storage unit that stores said delivery key;

a delivery key registration unit that registers said delivery key linked to said user information in said delivery key storage unit based on said corresponding information;

an encryption key receiving unit that receives an encryption key using said delivery key stored in said delivery key storage unit;

a user change unit that authenticates a changed user and acquires changed user information on said changed user, and transmits said changed user information; and a server, including:

a master information storage unit that stores said corresponding information between said user information on a user to utilize said terminal device and a delivery key used when an encryption key is transmitted, said correspondence information being linked to terminal identification information on said terminal device;

a terminal information storage unit that stores said terminal identification information, user information on said user utilizing said terminal device and said delivery key used when said encryption key is transmitted to said terminal device, wherein said terminal identification information, said user information and said delivery key are linked to each other;

an encryption key delivering unit that transmits said encryption key using said delivery key stored in said terminal information storage unit, said delivery key being linked to said user information on said user performing secret communication;

a corresponding information transmission unit that transmits said corresponding information between said user information and said delivery key, stored in said master information storage unit, to said terminal device;

a first user information receiving unit that receives first user information on a user first authenticated at said terminal device;

a first user information registration unit that updates said user information stored in said terminal information storage unit, said user information being linked to said terminal identification information, by said first user information received by said first user information receiving unit;

a delivery key registration unit that updates said delivery key stored in said terminal information storage unit, said delivery key being linked to said terminal device, by a first delivery key linked to said first user information received by said first user information receiving unit, based on said corresponding information;

a second user information receiving unit that receives said changed user information of said changed user authenticated at said terminal device; and a second user information registration unit that updates said user information stored in said terminal information storage unit, said user information being linked to said terminal identification information, by said changed user information received by said second user information receiving unit.

10. The key management system according to claim 9, wherein said server further comprising an encryption key updating unit that updates an encryption key of a first terminal device and a second terminal device of said plurality of terminal devices, before secret communication between said first terminal device and said second terminal device.

* * * * *